(12) United States Patent
Hopkins, III et al.

(10) Patent No.: US 10,521,780 B1
(45) Date of Patent: Dec. 31, 2019

(54) BLOCKCHAIN BASED TRANSACTION MANAGEMENT

(71) Applicant: UIPCO, LLC, San Antonio, TX (US)

(72) Inventors: John C. Hopkins, III, San Antonio, TX (US); Bharat Prasad, San Antonio, TX (US); Hudson R. Jameson, Aubrey, TX (US); Gopinath Rangan, Milpitas, CA (US)

(73) Assignee: United Services Automobile Association (USAA), San Antonio, TX (US)

( * ) Notice: Subject to any disclaimer, the term of this patent is extended or adjusted under 35 U.S.C. 154(b) by 409 days.

(21) Appl. No.: 15/380,122

(22) Filed: Dec. 15, 2016

Related U.S. Application Data (60) Provisional application No. 62/268,209, filed on Dec. 16, 2015.

(51) Int. Cl.
*G06Q 20/10* (2012.01)

(52) U.S. Cl.
CPC .................... *G06Q 20/10* (2013.01)

(58) Field of Classification Search
CPC ............................ G06Q 20/00–425
See application file for complete search history.

(56) References Cited

U.S. PATENT DOCUMENTS

| | | | | |
|---|---|---|---|---|
| 9,189,900 | B1 * | 11/2015 | Penilla | B60L 53/305 |
| 9,722,790 | B2 * | 8/2017 | Ebrahimi | H04L 9/3066 |
| 2015/0332395 | A1 | 11/2015 | Walker et al. | |
| 2015/0379510 | A1 | 12/2015 | Smith | |
| 2016/0203477 | A1 | 7/2016 | Yang et al. | |
| 2016/0300234 | A1 * | 10/2016 | Moss-Pultz | G06F 21/10 |
| 2017/0011460 | A1 | 1/2017 | Molinari et al. | |
| 2017/0046664 | A1 | 2/2017 | Haldenby et al. | |
| 2017/0053249 | A1 | 2/2017 | Tunnell et al. | |
| 2017/0053460 | A1 * | 2/2017 | Hauser | G07C 5/008 |
| 2017/0103391 | A1 | 4/2017 | Wilson, Jr. et al. | |
| 2017/0109748 | A1 | 4/2017 | Kote | |

(Continued)

FOREIGN PATENT DOCUMENTS

| | | |
|---|---|---|
| AU | 2016101183 A4 | 9/2016 |
| CN | 105488722 A | 4/2016 |

(Continued)

*Primary Examiner* — Calvin L Hewitt, II
*Assistant Examiner* — Taylor S Rak
(74) *Attorney, Agent, or Firm* — Fletcher Yoder P.C.

(57) ABSTRACT

Techniques are described for managing a transaction, such as a purchase of a vehicle or other product, using one or more blockchains. The completion of a transaction may be facilitated by providing an information portal, such as one or more application user interfaces, to enable the buyer, seller, or other parties to readily access blockchain-stored information that is relevant to the transaction. In some examples, where the product to be purchased is a vehicle (e.g., car, truck, motorcycle, boat, etc.), the blockchain-stored information may include information regarding the loan, title, insurance, driver's license or other identification verification, vehicle ownership history, inspection history, repair history, lien information, and so forth. The portal also enables a point of contact to be maintained between the buyer and a lender during the process of purchasing the product.

12 Claims, 7 Drawing Sheets

(56) References Cited

U.S. PATENT DOCUMENTS

| | | |
|---|---|---|
| 2017/0116693 A1 | 4/2017 | Rae et al. |
| 2017/0140375 A1 | 5/2017 | Kunstel |
| 2017/0154331 A1 | 6/2017 | Voorhees |
| 2017/0193619 A1 | 7/2017 | Rollins et al. |
| 2017/0206532 A1 | 7/2017 | Choi |
| 2017/0214699 A1 | 7/2017 | Johnsrud |
| 2017/0228704 A1 | 8/2017 | Zhou et al. |
| 2017/0230375 A1 | 8/2017 | Kurian |
| 2017/0237554 A1 | 8/2017 | Jacobs et al. |
| 2017/0287068 A1 | 10/2017 | Nugent |
| 2018/0247302 A1* | 8/2018 | Armstrong ......... G06Q 20/3827 |

FOREIGN PATENT DOCUMENTS

| | | |
|---|---|---|
| CN | 105681301 A | 6/2016 |
| CN | 105956923 A | 9/2016 |
| CN | 105976231 A | 9/2016 |
| CN | 106228446 A | 12/2016 |
| CN | 106408299 A | 2/2017 |
| CN | 106530088 A | 3/2017 |
| CN | 106600403 A | 4/2017 |
| WO | 2016201429 A1 | 12/2016 |
| WO | 2017027648 A1 | 2/2017 |
| WO | 2017091530 A1 | 6/2017 |
| WO | 2017109140 A1 | 6/2017 |
| WO | 2017136643 A1 | 8/2017 |
| WO | 2017136956 A1 | 8/2017 |
| WO | 2017139688 A1 | 8/2017 |
| WO | 2017143435 A1 | 8/2017 |

\* cited by examiner

BLOCKCHAIN BASED TRANSACTION MANAGEMENT

CROSS-REFERENCE TO RELATED APPLICATION

The present disclosure is related to, and claims priority to, U.S. Provisional Patent Application Ser. No. 62/268,209, titled "Blockchain Based Transaction Management," which was filed on Dec. 16, 2015, the entirety of which is hereby incorporated by reference into the present disclosure.

BACKGROUND

To purchase a car, a buyer may spend many hours at a dealership while the buyer and seller examine and/or exchange information related to auto loan(s), insurance, driver's license, vehicle title, and so forth. If the buyer is dealing with an individual seller, the parties may go to a bank to process the loan information, or to a government office to handle transfer of title. The seller may require that the buyer pay using a certified check, or the seller may risk trusting the buyer by accepting a personal check. Traditionally, the information exchanged during a car purchase may be conveyed via paper documents that may be awkward to handle or prone to inaccuracy, leading to additional delays in completing the purchase. In some scenarios, before walking into a dealership, a buyer may have already secured a loan from a lender. However, during the lengthy process to complete the purchase, a financing officer at the dealership may have ample opportunity to offer a loan with different terms. Thus, the original lender may lose loan business because the buyer may not have convenient access to loan information to enable them to compare offers, and because the buyer may not retain a channel of communication with the original lender while at the dealership.

SUMMARY

Implementations of the present disclosure are generally directed to the use of blockchain(s) to store information regarding a transaction. More specifically, implementations are directed to the use of blockchain(s) to store data regarding the sale of a vehicle such as an automobile.

In general, innovative aspects of the subject matter described in this specification can be embodied in methods that includes actions of: accessing, by a first application executing on a first computing device, buyer information stored in at least one blockchain, the buyer information associated with a transaction; responsive to accessing the buyer information stored in the at least one blockchain, providing a token to enable a second application executing on a second computing device to access the buyer information stored in the at least one blockchain; and receiving, at the first application, an indication that the second application has accessed the at least one blockchain to verify the buyer information and, in response, completing the transaction.

Implementations can optionally include one or more of the following features: completing the transaction further comprises accessing, by the first application, a digital contract associated with the transaction, the digital contract stored in the at least one blockchain; completing the transaction further comprises updating the digital contract to include a digital signature of a buyer; receiving a private key for accessing a product for which ownership is transferred in the transaction; the transaction is a sale of a vehicle from a seller to a buyer; the vehicle is associated with a public key; the private key enables operation of the vehicle; the buyer information indicates a source of funds to be transferred in the transaction; the source of funds includes one or more of a financial account identifier or an approved loan identifier; the token is a scannable code presented in a user interface of the first application; the scannable code encodes data for accessing the buyer information stored in the at least one blockchain; or the token is a cryptographic key for accessing the buyer information stored in the at least one blockchain.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. Implementations employ blockchain(s) to store data relevant to a vehicle purchase, such as buyer funding information (e.g., loan information), proof of insurance, title information, vehicle history, and so forth. The blockchain(s) may also store a smart contract that governs the purchase of the vehicle, and the parties to the sale may electronically sign to the smart contract to signify their agreement to the terms of the contract. By employing blockchain(s) to store information, implementations leverage the security and immutability of blockchain(s) to provide secure and reliable updates to sales data, vehicle data, or other data stored on blockchain(s). Implementations also take advantage of the consensus-reaching features of blockchain(s) to ensure that the sales transaction data or other data recorded in blockchain(s) is complete, accurate, and up-to-date.

An advantage of using blockchain(s) to store transaction data is the decentralized aspect of the consensus network for the blockchain(s). The replication of a blockchain across multiple trusted nodes implies there is no single entity that the buyers and sellers need to go to in order to demonstrate their trust in each other and in the transaction at hand. Another advantage is the encrypted assurance that the blockchain stores the entire footprint of the history of the data and its migration over time. For example, ownership history of an asset is traceable, using the blockchain, from the current owner back to the asset's first owner within the blockchain, without having to access a complex, and possibly non-trustworthy, external system to retrieve the ownership history of the asset.

Other advantages of using a blockchain are provided by the secure nature of a blockchain. By virtue of the inherent nature of a blockchain, there is no database administrator or other individual that may circumvent the security to change, delete, or move a record stored in a blockchain. Data stored in conventional databases often requires third party intermediaries to maintain data integrity and system availability. Use of a blockchain for transaction data storage eliminates the need for the following: power intensive data centers; firewalls; PKI solutions; redundancy; disaster recovery provisions; business continuity provisions; routing and switching solutions; and expensive database operating systems and software.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to systems, devices, methods, and computer-readable media for managing a transaction, such as a purchase of a vehicle or other product, using one or more blockchains. In some implementations, the completion of a transaction is facilitated by providing an information portal, such as one or more application user interfaces (UIs), to enable the buyer, seller, or other parties to readily access information that is stored on blockchain(s), where the information is relevant to the transaction. In some examples, where the product to be purchased is a vehicle (e.g., car, truck, motorcycle, boat, etc.), the blockchain-stored information may include information regarding the loan, title, insurance, driver's license or other identification verification, vehicle ownership history, inspection history, repair history, maintenance history, lien information, and so forth. The portal also enables a point of contact to be maintained between the buyer and a lender during the process of purchasing the product. Moreover, implementations may also be employed to facilitate other types of transactions, such as leases, car sharing arrangements, and so forth. Implementations may also be employed to facilitate transactions involving assets other than cars, such as other types of vehicles, smart home assets and devices, real estate, and/or other goods or services. The vehicles involved in the transaction may be new vehicles or used (e.g., pre-owned) vehicles, and the transaction may be a purchase, a lease, rental, or any other appropriate type of transaction.

In some implementations, a user such as a buyer or seller may employ an application (e.g., an app) that executes on the user's smartphone or other computing device. The application may communicate with server computing device(s) or data storage device(s) that store one or more blockchains. The blockchain(s) may store information regarding the buyer, the product (e.g., vehicle) to be purchased, the seller, or other entities. For example, the buyer or seller may use the application to access a blockchain that stores information regarding the buyer's auto insurance, loan approval, driver's license, or other information. The application may also enable access to a blockchain that stores information regarding the vehicle, such as make, model, and year of the vehicle, features, title information, repair history, manufacturer data (e.g., product specifications), and so forth. In some examples, a blockchain may have already been populated with information before the buyer meets with the seller. For example, a lender may approve a loan for the buyer and include the loan amount in a blockchain that is accessible by the buyer and/or the seller. An insurance company may store information in a blockchain to indicate that the buyer carries auto insurance.

In some examples, information may be added to a blockchain, or a blockchain may be created, while the buyer is meeting with the seller (e.g., at a car dealership). For example, the buyer may scan the vehicle identification number (VIN) of the vehicle and enter the amount or other terms of the sale, which may be added to a blockchain associated with the vehicle. On scanning or otherwise entering the VIN, the buyer may use the app to access information regarding the vehicle to verify the seller's statements regarding repair history, auto parts, title, previous owners, odometer reading, existing liens, and so forth. In situations where the seller (e.g., the dealer) counters with their own loan offer, the buyer may use the application to access previously stored loan information and compare the terms of the new offer to their already approved loan. The buyer may also use the application to consult in real time (e.g., via chat or instant messaging) with their lender regarding the loan. In some implementations, one or more of the buyer, the seller, an insurance company, a lender, or external entities (e.g., agencies, individuals, etc.) may have controlled access to data stored on the blockchain(s).

The application may also include feature(s) that provide the seller with information verifying that the buyer has been approved for a loan in the appropriate amount, carries insurance, holds a valid driver's license, or other details. In some examples, the verification may be provided through a barcode that the seller may scan. The barcode may be a one-dimensional barcode such as a Universal Product Code (UPC). The barcode may have multiple dimensions, such as a Quick Response (QR) code. The barcode may be displayed via the application and the seller may scan it directly as it is displayed on the buyer's computing device (e.g., smartphone). Alternatively, the buyer may print out the barcode and present it to the seller. In some examples, the application executing on the buyer's computing device may retrieve a cryptographic key which may be provided to the seller's application executing on the seller's computing device. The seller's application may use the key to access blockchain information regarding the buyer's loan, insurance, driver's license, and so forth.

Parties to a contract may exchange keys or other credentials to enable access to each other's blockchains. For example, a seller may be (e.g., via a cryptographic key) given access to a blockchain that includes buyer information such as loan information, insurance verification, driver's license, passport, social security number (SSN), or other identification verification, driving record, and so forth. The buyer's blockchain may also include data indicating that the driver's license, passport, or other credential of the buyer has been validated by a trusted authority, such as a government agency. A buyer may be given access to a blockchain that includes seller information such as reputation data (e.g., customer reviews), business history (e.g., how long the seller has been in business), and so forth. The buyer and/or seller may have access to a blockchain that stores data regarding the vehicle. Such data may include title information, liens, repair history, parts history, odometer information, manufacturer information, warranties, usage patterns such as accident history, ratio of freeway to city street mileage, and so forth. A blockchain may be associated with a trust relationship, such that a seller (e.g., dealer) may be able to access a blockchain that they trust, and the seller may be able to access a blockchain if there is a trust relationship between the seller and the blockchain.

The seller may use their instance of the application to scan the barcode, or access blockchain data with the key provided by the buyer's application, and verify that various criteria for the sale have been met. The parties may agree to the final terms and sign an electronic version of a contract, and funds may be transferred to the seller. Funds transfer may be via an escrow account, and may be facilitated by a smart contract that automatically sends signals to perform other operations to trigger the funds transfer. In some examples, title transfer may also be performed automatically, e.g., through the smart contract, if the parties agree to the terms. Title transfer may be performed via an update to a blockchain that stores title information for the vehicle. In some examples, title information may be stored on a blockchain that is maintained by a government agency. A smart contract may access information stored in blockchain(s), and perform operations to receive the parties' signatures and automatically execute the terms of the contract, such as transferring title, transferring funds, and so forth. In some implementations, the smart contract may also enable the buyer to operate the vehicle in response to execution of the terms of the sale contract, as described further below.

A blockchain may be populated with data that includes text, scanned images, or any other data formats or data types. In some implementations, the data may be hashed to create a digital digest that is employable as a one-way encryption proof of the data when it is presented. The digital digest may be added into the blockchain(s). In some examples, the original data may be stored in blockchain(s) along with the digital digest of the data. For example, digital images of a driver's license or other data may be stored in the blockchain, as well as a digital digest of such image(s). In such examples, a cryptographic key may be employed to access data directly on the blockchain without using a hash key to retrieve the data from a digital digest.

In some implementations, the application may include features to enable searching blockchain(s) for vehicles that correspond to specified search criteria. For example, a user looking to buy a vehicle may search for vehicles that have no liens against them, have their original engine, have been driven less than a specified number of miles, and so forth. The application may communicate the search criteria to a back end process that searches blockchains for matches, and search results may be presented to the buyer and/or seller via the application(s).

After the sale is approved and the title is transferred, the buyer's application may enable the buyer to start and operate the vehicle. This feature may be controlled through public key cryptography. A vehicle may be associated with a public key, such that whoever has access to a corresponding private key may be able to operate the vehicle. After the title is transferred to the buyer, as indicated in the blockchain for the vehicle, the seller may relinquish the private key to the buyer such that the seller no longer has access to the key. The private key may be stored in a blockchain accessible by the buyer, or in some other secure storage on the buyer's device or elsewhere. The ignition system may be connected to the internet or to a local network that is accessible by the buyer's device. In some cases, the application (e.g., executing on the buyer's computing device) may communicate with the ignition system via near field communication (NFC) or other communication methods. The application may function as a starter by using the private key to access the ignition system and send an instruction that causes the ignition system to start the vehicle.

In some implementations, the key-based ignition system may enable multiple users (e.g., multiple owners or users sharing a vehicle) to access a vehicle using multiple keys that are associated with a "root" or "master" public key using a hierarchical deterministic key creation scheme. In some examples, the various keys may be employable to start the vehicle during different time periods, enabling vehicle sharing in which each user may use the vehicle during a particular period of time. Where applicable, a blockchain's multi-signature feature can be implemented to validate multiple party authorizations. Other individuals such as a lien-holder may also have access to keys that enable access to the vehicle. In some examples, a lien-holder may be able to disable access to the vehicle by other users, e.g., if loan payments are missed. The access control mechanism may also enable other features, such as disabling a vehicle if maintenance checks are overdue, blocking particular users (e.g., teen drivers) from using a vehicle during inclement weather, and so forth. This feature may be used for manually driven vehicles or self-driving vehicles. The feature may also be used to control access to other assets, such as enabling or disabling electronic access to buildings.

Blockchain(s) may also be employed to store information related to accidents, repairs, or other events. After an accident has been reported, information may be collected to verify that the accident occurred. Such information may include vehicle identification information, location information, time/date information, images from satellites, drones, or location-specific cameras, data from sensors included in the vehicle or parts of the vehicle, data from telematics and onboard diagnostics (OBD) devices, or data from user devices such as smartphones or wearable computers. In some examples, the data collection may begin automatically even without an explicit accident report from a user, based on sensor data received from the vehicle or from individual parts of the vehicle. Some components (e.g., parts) of the vehicle may include sensors that communicate information regarding the state of the component.

A smart contract may access the data in the blockchain, analyze the data, and determine a probability that the accident occurred as reported. If the probability is higher than a threshold probability, the smart contract may proceed to determine what parts are to be repaired based on sensor data received from the vehicle or from individual parts of the vehicle. The threshold probability may be set by the owner, a driver, or other stakeholders such as the insurance company, lien holder, leasing company, guarantor, etc. The smart contract may be automatically or manually triggered to solicit quotes or bids from local repair shops on behalf of an insurance company, determine a lowest bid, and send the user instructions describing the shop to be used for repairs. Other information, such as customer reviews or service history information, may also be employed to determine the repair shop to be used.

In some examples, an escrow system may be employed to mediate the repair payments, to ensure that the selected repair shop abides by the quote they gave during bidding. If the shop charges an amount that is higher than their previous quote, the smart contract may not send the escrowed funds to the repair shop and may instead perform an arbiter negotiating subsequence of the smart contract that attempts automatic dispute resolution.

In some implementations, blockchain(s) may be employed for vehicle maintenance functions. An application may be used by the driver to initiate a maintenance event, or the vehicle can automatically initiate a maintenance event to cause maintenance information to be stored on blockchain(s). The stored maintenance information may include a location of the vehicle based on previously collected location information (e.g., city, state, postal code) for the owner of the vehicle, and/or based on information received from a satellite-based position system such as the Global Positioning System (GPS). The maintenance information may also include vehicle maintenance code(s) such as Diagnostic Trouble Codes (DTCs) and/or OBD codes indicating the problems. Based on the maintenance information, a determination may be made of an estimated cost range for the repair and/or a particular repair shop to be used. Such a determination may be made based on calls to a callable network service (e.g., API) provided by a repair shop network. The cost estimate(s) and/or identified repair shop information may also be added to the maintenance information stored on the blockchain(s). In some examples, the blockchain(s) can be accessed and used as a trusted note (e.g., from an insurance company) that the user may present at a repair shop to authorize the repairs.

In some implementations, blockchain(s) may be employed for vehicle fuel purchase. An application can be used by the driver to initiate a fuel purchase transaction that allows a blockchain to gather information for fueling including the fuel grade, fuel amount (e.g., fill the tank), dollar limit, additive codes, carwash purchase option and type, payment mechanism, and so forth. The blockchain(s) can be used by the fuel retailer as a trusted note of command that the fuel dispenser executes to.

In some implementations, blockchain(s) may be employed to store performance metric(s) for driver(s) and/or vehicle(s). An application can be used by the driver to initiate the collection of information describing user driving performance (e.g., hard brakes, acceleration, driving within or over speed limit, etc.), and/or vehicle performance (e.g., maintenance issues, engine parameters from DTC or OBD feedback, lubricant or other fluid status, etc.). Such information may be collected from onboard computer(s) or telematics device(s), and stored in blockchain(s). The stored data may be retrieved and presented in a performance dashboard of the application, to provide advice for drivers, to initiate action(s) for vehicle maintenance, and/or for insurance purposes.

In some implementations, blockchain(s) may be used to store information to determine a total cost of ownership (TCO) of a vehicle. An application can be used to initiate blockchain(s) to capture the total cost of ownership of the vehicle, including expenses incurred from auto loan payments, down payment, fuel cost, maintenance cost, depreciation, repair cost, insurance cost, or other expenses. The blockchain TCO data may be accessed and presented by the application to provide advice to the user regarding the TCO and any actions the user may take to lower the TCO.

Figure 1:
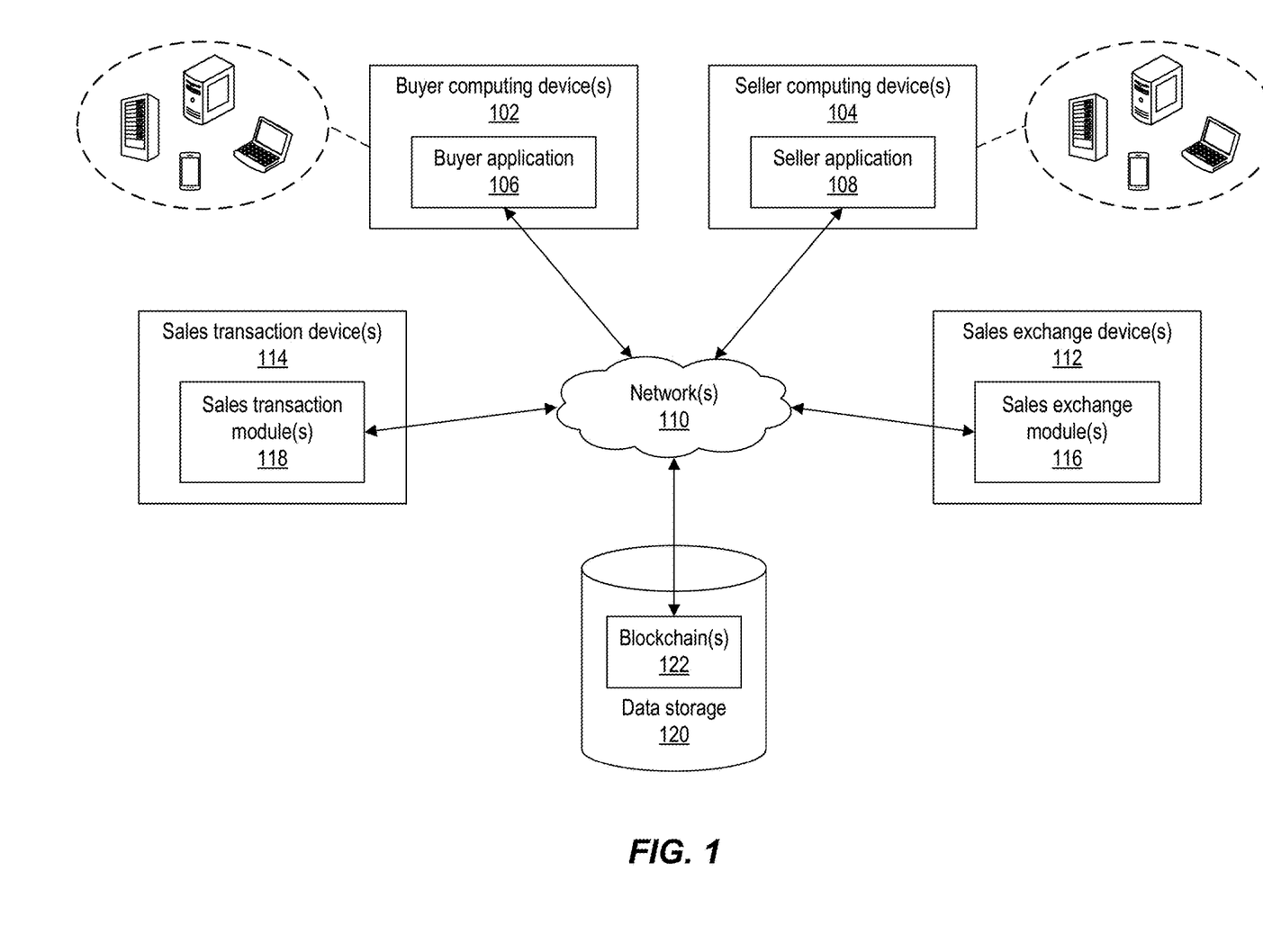
FIG. 1 depicts an example system for managing transactions using data stored on blockchain(s), according to implementations of the present disclosure.

FIG. 1 depicts an example system for managing transactions using data stored on blockchain(s), according to implementations of the present disclosure. As shown in the example of FIG. 1, the system may include one or more buyer computing device(s) 102 executing a buyer application 106, and one or more seller computing device(s) 104 executing a seller application 108. The buyer computing device(s) 102 and seller computing device(s) 104 may include any type of computing device, without limitation. In some examples, one or more of the buyer computing device(s) 102 or the seller computing device(s) 104 may be a mobile device such as a smartphone, wearable computing device, or tablet computer. In some examples, one or more of the buyer computing device(s) 102 or the seller computing device(s) 104 may be a non-mobile or less mobile device such as a desktop computer or a customer support kiosk. Although FIG. 1 depicts an example in which the buyer computing device(s) 102 are separate from the seller computing device(s) 104, in some examples the buyer computing device(s) 102 may include one or more same devices as the seller computing device(s) 104.

The buyer application 106 and the seller application 108 may each include a UI, and may be useable by a buyer and seller respectively to view information and perform actions associated with a transaction. The buyer application 106 and the seller application 108 may include any type of application, including but not limited to a mobile app, a web app, a native application, and so forth. In some examples, one or both of the buyer application 106 or the seller application 108 may include an artificial intelligence (AI) interface that automates at least a portion of the transaction processing. In some implementations, the buyer application 106 and the seller application 108 may be a same application that presents different interfaces, e.g., a different set of information, controls, or other UI elements, to a buyer and a seller.

The system may also include one or more sales exchange devices 112 executing one or more sales exchange modules 116, and one or more sales transaction devices 114 executing one or more sales transaction modules 118. In some implementations, the sales exchange device(s) 112 may include a same set of device(s) as the sales transaction device(s) 114, executing both the sales exchange module(s) 116 and the sales transaction module(s) 118. The sales exchange device(s) 112 and the sales transaction device(s) 114 may include any type of computing device(s), such as server computers, network computers, distributed computing devices (e.g., cloud servers), and so forth. In some implementations, one or more of the sales exchange module(s) 116 or the sales transaction module(s) 118 may be a decentralized autonomous organization (DAO) that employs automation to make decisions regarding purchase transactions, based on information provided by the parties and/or information stored on the blockchain(s) 122.

A DAO, which may also be described as a fully automated business entity (FAB) or distributed autonomous corporation/company (DAC), may include a decentralized network of narrow-AI autonomous agents which perform an output-maximizing production function and which divides its labor into computationally intractable tasks. In some examples, the DAO may perform tasks itself. A DAO may be described as a corporation run without human involvement under the control of an incorruptible set of business rules. These rules may be implemented as publicly auditable open-source software distributed across multiple stakeholder computers.

A blockchain is a system that enables the DAO to function through one or more smart contracts. A DAO may handle asset transfer functions that are traditionally handled by human-operated intermediaries. For example, a sale of an automobile may require the use of a title transfer DAO, in which the DAO perform AI operations to handle the task of recording title transfer (e.g., in exchange for a digital currency fee). An interface with the DAO can be coded into the asset (e.g., vehicle) sale system and become a function of the asset sale system.

The system may include data storage 120, including one more data storage devices that implement one or more databases or datastores of any type, including relational and/or non-relational datastores. The data storage 120 may store one or more blockchain(s) 122 that store information describing one or more of: the buyer, the seller, the vehicle or other product to be purchased, and so forth. The blockchain(s) 122 may provide a central repository of data that is relevant to the transaction and that is necessary for completing the transaction.

The buyer computing device(s) 102, the seller computing device(s) 104, the sales exchange device(s) 112, the sales transaction device(s) 114, and the data storage 120 may communicate with one another over one or more networks 110. The network(s) 110 may include any type of communication network(s), including wired and/or wireless network(s). In some implementations, the communications over the network(s) 110 may be encrypted or otherwise secured against unauthorized access to the communicated data.

The buyer application 106 may be used by the buyer to retrieve information stored in the blockchain(s) 122. In some examples, the buyer application 106 may access the blockchain(s) 122 over the network(s) 110. In some examples, the sales exchange module(s) 116 and/or the sales transaction module(s) 118 may access the blockchain(s) 122 over the network(s) 110 to retrieve stored information, and the buyer application 106 may request the retrieved information from the sales exchange module(s) 116 and/or the sales transaction module(s) 118. The buyer application 106 may present the stored information to enable the buyer to make a decision whether to purchase the product (e.g., vehicle). In some implementations, the buyer application 106 may also retrieve vehicle data (e.g., for the vehicle to be purchased) from the vehicle's engine control module (ECM), in-vehicle telematics device, and/or navigation system via a Bluetooth connection or other network connection.

The seller may use the seller application 108 to assist in selling a vehicle or other item. The seller may be an individual, a dealership, a Distributed Autonomous Corporation (DAC), or any other type of entity. The seller application 108 may obtain information required to sell a vehicle or other item from the blockchain(s) 122, or via the sales exchange module(s) 116 and/or the sales transaction module(s) 118.

Once the buyer and seller agree on the terms of the transaction, information relevant to the sale of the vehicle may be collected by the sales exchange module(s) 116 from the blockchain(s) 122 and/or the parties (e.g., buyer and seller applications) and consent may be granted to execute the transaction. The sales exchange module(s) 116 may initiate the sale by sending the relevant information to the sales transaction module(s) 118.

The sales transaction module(s) 118 may receive funds from the buyer as a funds transfer from a bank account or as funds that are part of a loan to the buyer. The funds may be stored in a smart contract escrow account while vehicle registration and title transfer are written to their respective blockchains. Once all legal requirements have been satisfied the escrowed funds may be released to the seller to complete the transaction. In some implementations, the vehicle's private key may be transferred from the seller to the buyer to enable the buyer to activate the ignition system on the vehicle and operate the vehicle. The various operations for managing the transaction are described further with reference to FIGS. 3-6.

In some implementations, the buyer application 106 provides other features such as features that facilitate searching for a vehicle to buy or lease. The application 106 may enable a user to enter search criteria for a vehicle, such as a preferred make, model, or year of the vehicle, type of vehicle (e.g., car, truck, sedan, SUV, etc.), a price range, and so forth. The application 106 may enable the user to set specific location criteria to search for available vehicles near the user's location. In some instances, the application 106 may receive location information from the buyer device 102, such as location information generated using a satellite-based navigation system such as the GPS. Based on the various criteria, the application 106 may send a request to search for available vehicles. In some instances, the search may be performed in a data store that includes information describing vehicles available for purchase or lease in various locations. In some instances, the data store may be on the blockchain(s) 122. Search results may be generated and communicated to the buyer device 102 to presentation in the application 106. The user may then view the search results. In some instances, the application 106 may enable the user to initiate the process to purchase or lease a vehicle selected from the search results, and the process may proceed as described herein.

In some implementations, the application 106 may indicate the dealers or other sellers that are in proximity to the user and that have the selected vehicle available for sale, and the user's selection of a vehicle may include an indication that the seller is to be contacted and provided with access to the buyer's blockchain information to facilitate the purchase or lease. The process for purchasing or leasing the vehicle may then proceed at least partly in a virtual manner, e.g., not requiring the buyer to be in the physical presence of the seller. In this manner, implementations may allow a virtual and/or remote vehicle purchase experience that is secured by use of the blockchain(s) 122, and that is facilitated by the blockchains' establishment of trust relationships between the parties involved in the transaction.

As described herein, the transaction may be a purchase, lease, rental, or other suitable type of transaction. In some instances, the transaction may be to rent, borrow, or otherwise use a vehicle for a limited period of time as part of a ride-sharing service. The service may enable a user to use a vehicle for a period of time for free, in exchange for a fee, as part of a service subscription model, or under some other arrangement. In such instances, the system may use the blockchain(s) 122 to store information regarding the vehicles being borrowed or shared, payment information for using the service, insurance information (e.g., the user's auto insurance and/or the insurance carried by the ride-sharing service), driver's license information, and so forth. For example, in instances where a rider has hired a vehicle as part of a taxi service, ride-sharing service, and so forth, the blockchain(s) 122 may store information regarding the driver's license and/or insurance, the maintenance history of the vehicle, accident history of the driver and/or vehicle, and so forth. The passenger may access this information on the blockchain(s) 122 and use such information to determine whether to accept a ride. The driver may access the passenger's blockchain information to receive payment information, history of passenger interactions with drivers in the service, and so forth. In instances where the ride-sharing service provides additional services such as food or parcel delivery, the payment, transaction processing, order processing, and/or other information may be transferred through the blockchains as well.

The system may also be used for autonomous (e.g., self-driving, AI-controlled) vehicles that may not have a driver. Such vehicles may be fully autonomous or semi-autonomous. In such instances, the blockchain-based system may facilitate a user hiring an autonomous vehicle, providing payment, and checking insurance (of the passenger and/or vehicle). The blockchain may store payment information, insurance information, maintenance/repair history, and/or other information regarding the vehicle and/or the passenger. In some instances, an autonomous vehicle may have sufficient AI capabilities that it may be able to independently initiate transactions to purchase fuel, replace parts, purchase maintenance services, and so forth. In such instances, the transactions may be conducted through the blockchain(s).

Figure 2:
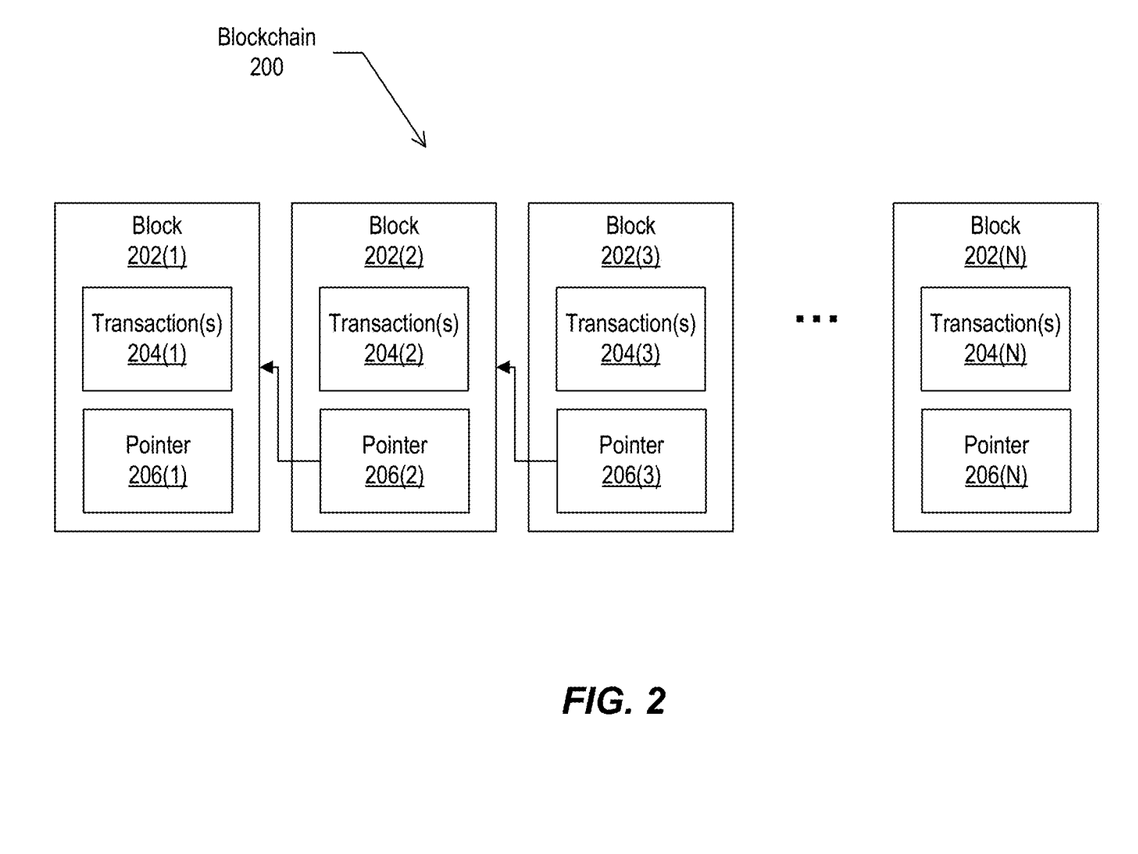
FIG. 2 depicts a schematic of an example blockchain, according to implementations of the present disclosure.

FIG. 2 depicts a schematic of an example blockchain 200, according to implementations of the present disclosure. The blockchain 200 may describe the blockchain(s) 122 or other blockchains. As shown in FIG. 2, a blockchain 200 may include any number of blocks 202, in this example numbered 1 through N where N is any number. A block 202 may include, or be associated with a list of transaction(s) 204. The transaction(s) 204 may include the data stored in the blockchain 200, and each block 202 may store any number of records each indicating when and in what order the transaction(s) 204 are applied to modify the data stored in the blockchain 200. Each block 202 may also include a pointer 206 that identifies a previous (e.g., or next) block 202 in the blockchain 200.

To provide further context for the present disclosure, a high-level discussion of blockchain technology is provided. In general, a blockchain is a public ledger of all transactions that have ever been executed in one or more contexts (e.g., negotiable instrument transactions, digital currency transactions, etc.). A blockchain constantly grows as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all users (e.g., financial institutions) need to know all previous transactions (e.g., deposits, withdrawals, etc.) to validate a requested transaction, all users must agree on which transactions have actually occurred, and in which order. For example, if two users observe different transaction histories, they will be unable to come to the same conclusion regarding the validity of a transaction. The blockchain enables all users to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to-be-created block, and a nonce value (e.g., a random number used only once).

As introduced above, multiple nodes compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger system can include one or more sidechains. A sidechain can be described as a blockchain that validates data from other blockchains. In some examples, a sidechain enables ledger assets (e.g., a digital currency) to be transferred between multiple blockchains.

Figure 3:
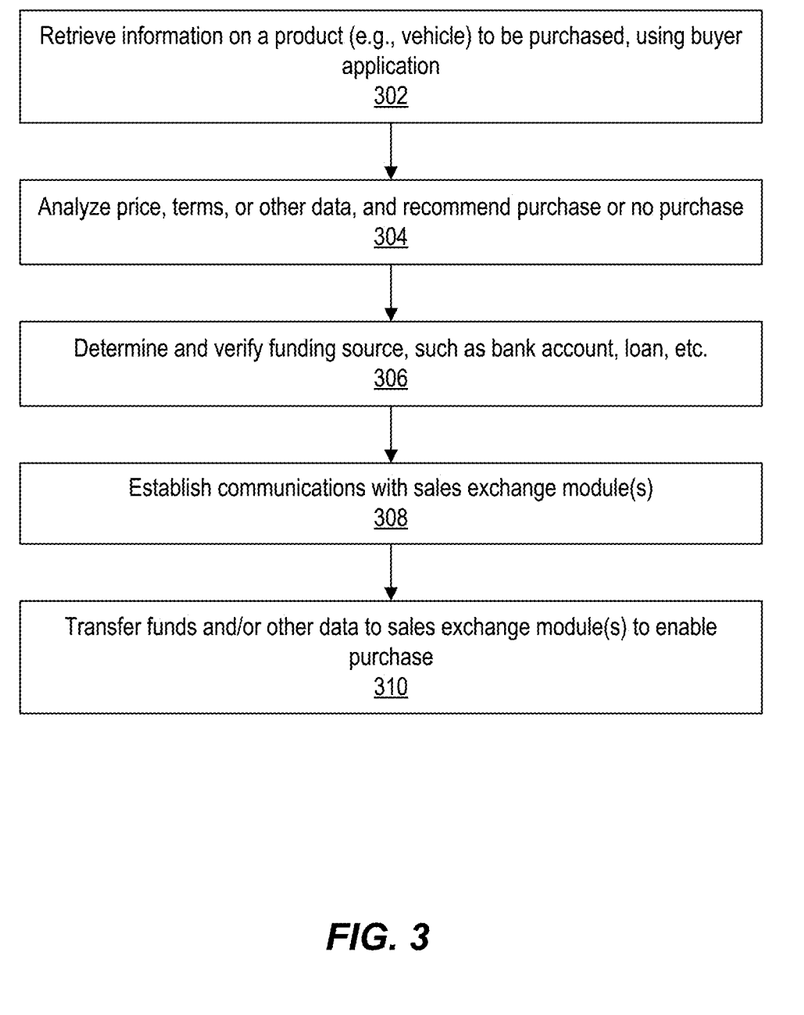
FIG. 3 depicts a flow diagram of an example process for managing a transaction from a buyer application, according to implementations of the present disclosure.

FIG. 3 depicts a flow diagram of an example process for managing a transaction from a buyer application 106, according to implementations of the present disclosure. Operations of the process may be performed by one or more of the buyer application 106 or other software module(s) executing on one or more of the buyer computing device(s) 102, the seller computing device(s) 104, the sales exchange device(s) 112, the sales transaction device(s) 114, or other device(s).

Using the buyer application 106, information may be retrieved (302) from the blockchain(s) 122, either directly over the network(s) 110 or via the sales exchange module(s) 116. The retrieved information may include vehicle information such as make, model, year, repair history, mileage, lien status, current owner, seller, price, or other information.

The buyer application 106 may analyze (304) the sale price, sales terms, and/or other vehicle information and recommend whether the buyer should purchase the vehicle or not purchase the vehicle. In some implementations, the recommendation may be based on previous criteria provided by the buyer, such as criteria for price range, age of the vehicle, mileage range, repair history, make or model, type of vehicle (e.g., truck, sedan, convertible, coupe, etc.), or other criteria.

If the buyer indicates that the purchase may go forward, e.g., based on the recommendation, the buyer application 106 may determine and verify (306) a funding source for the purchase. The funding source may be information regarding an approved vehicle loan for the buyer, or information indicating availability of funds in a financial account (e.g., bank account) of the buyer. The information regarding the funding source may be stored on the blockchain(s) 122 and may be verified to determine whether the funding source is present and holds sufficient funds for the purchase.

Communications may be established (308) between the buyer application 106 and the sales exchange module(s) 116. The buyer application 106 may transfer (310) funds and/or other data to the sales exchange module(s) 116 to initiate the purchase of the vehicle. In some implementations, the buyer application 106 may transfer a token to enable the sales exchange module(s) 116 to access the funding source information stored on the blockchain(s) 122. The buyer application 106 may also communicate other buyer information to the sales exchange module(s) 116 to enable the transaction.

Figure 4:
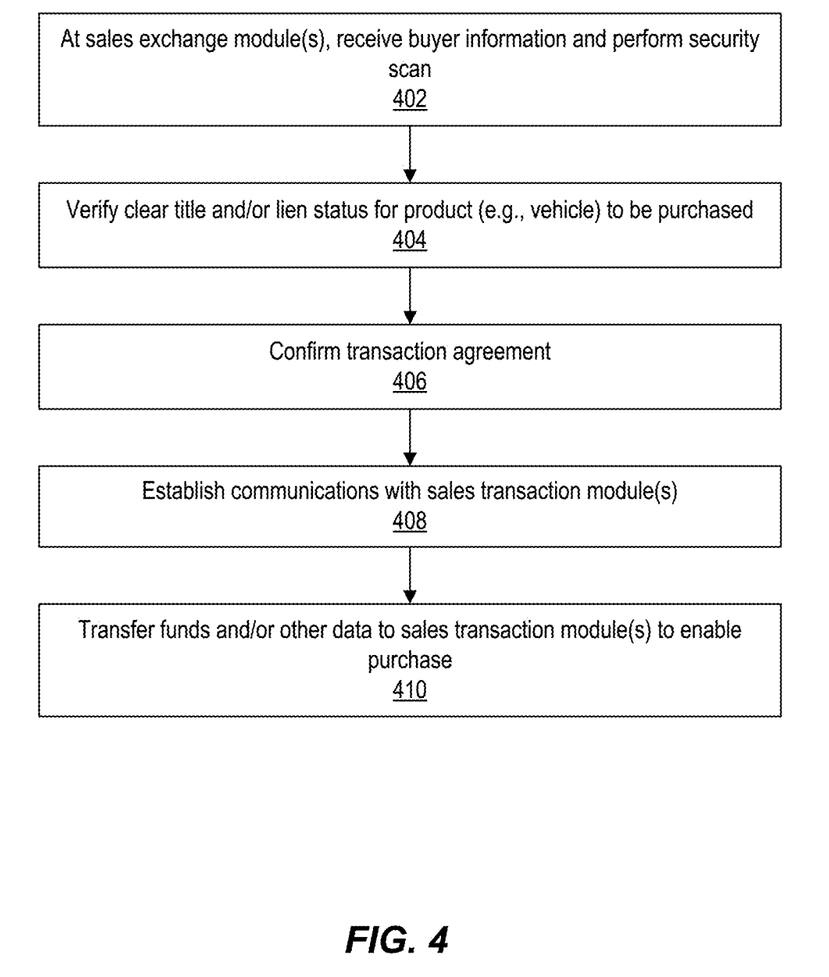
FIG. 4 depicts a flow diagram of an example process for managing a transaction from sales exchange module(s), according to implementations of the present disclosure.

FIG. 4 depicts a flow diagram of an example process for managing a transaction from sales exchange module(s) 116, according to implementations of the present disclosure. Operations of the process may be performed by one or more of the sales exchange module(s) 116 or other software module(s) executing on one or more of the buyer computing device(s) 102, the seller computing device(s) 104, the sales exchange device(s) 112, the sales transaction device(s) 114, or other device(s).

At the sales exchange module(s) 116, the buyer information may be received (402) from the buyer application 106 and/or the blockchain(s) 122. In some implementations, a security scan may be performed on the buyer information. The blockchain transaction may be employed in fully automated scenarios where the buyer and seller can be applications. The blockchain transaction may also be employed in situations where at least one of the buyer or seller is a person. In the scenario where buyer and seller are applications, the security scan can include the authentication and/or authorization verification of the applications to perform the roles that they claim (e.g., trusting the buyer and seller). In the scenario where at least one party is a human, the security scan may include biometric identity verification, and/or authentication through a username, password, PIN, secure token, and so forth. Where the buyer is a human, a security scan may include identity authentication that is any combination of biometric authentication, device authentication, password, private key validation, reputation validation, account standing verification, asset ownership validation, and/or other forms of authentication, to maximize the probability that the buyer is who they say they are. At least some of these forms may also be used in situations where the buyer is a DAO, an artificial intelligence, or an artificial intellect (Artilect).

The sales exchange module(s) 116 may verify (404) clear title status (e.g., valid title in the name of the seller) and/or clear lien status (e.g., no outstanding liens) for the vehicle or other product to be purchased. In some examples, this verification may be performed by accessing vehicle title and/or lien information stored on the blockchain(s) 122 associated with the vehicle. Based on the results of the security scan and the received buyer information, the transaction agreement may be confirmed (406). For example, the transaction agreement may be confirmed if the funding source indicates sufficient funds for the purchase, or if the buyer's terms otherwise correspond to the seller's terms.

Based on confirming the transaction agreement, the sales exchange module(s) 116 may establish communications (408) with the sales transaction module(s) 118. The sales exchange module(s) 116 may transfer (410) funds and/or other data to the sales transaction module(s) 118 to enable the sales transaction module(s) 118 to continue processing the purchase of the vehicle.

Figure 5:
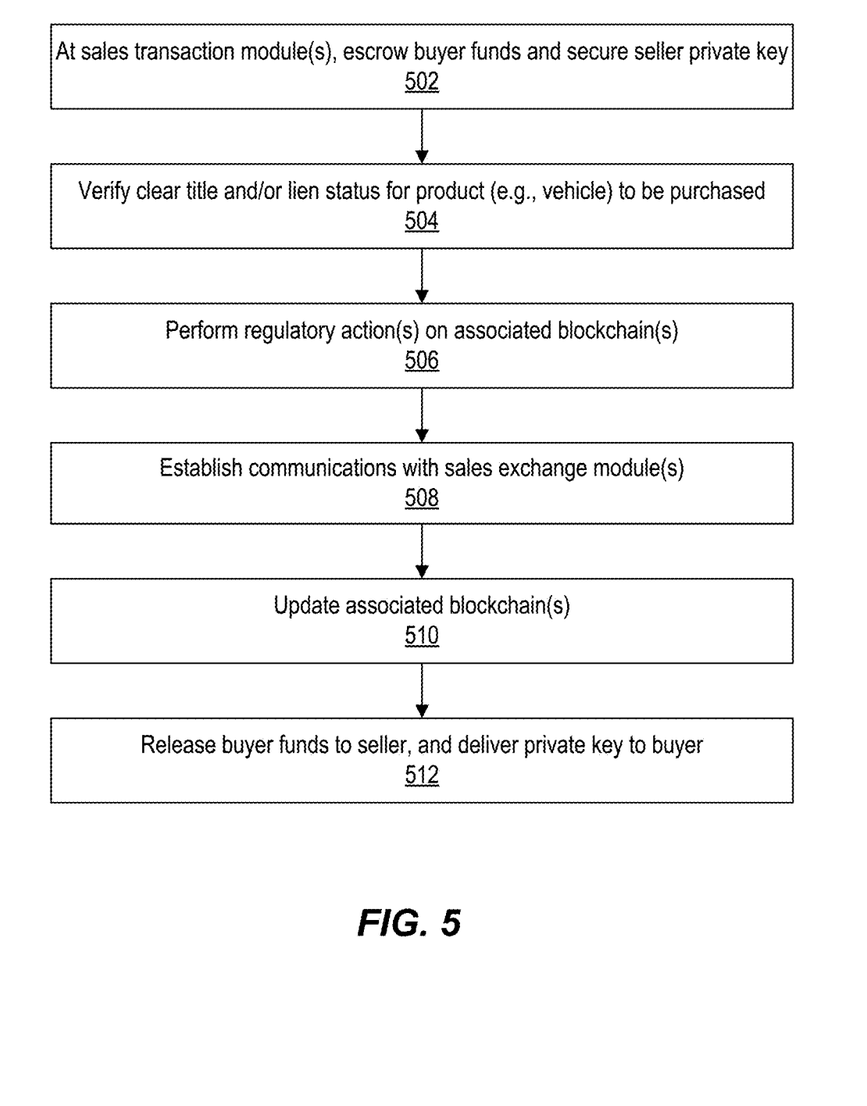
FIG. 5 depicts a flow diagram of an example process for managing a transaction from sales transaction module(s), according to implementations of the present disclosure.

FIG. 5 depicts a flow diagram of an example process for managing a transaction from sales transaction module(s) 118, according to implementations of the present disclosure. Operations of the process may be performed by one or more of the sales transaction module(s) 118 or other software module(s) executing on one or more of the buyer computing device(s) 102, the seller computing device(s) 104, the sales exchange device(s) 112, the sales transaction device(s) 114, or other device(s).

On receiving the information sent from the sales exchange module(s) 116 (e.g., 410), the sales transaction module(s) 118 may escrow buyer funds (502). In some implementations, the sales transaction module(s) 118 may also secure the seller private key, e.g., a private key that may be employed to activate the ignition system and enable operation of the vehicle.

The sales transaction module(s) 118 may verify (504) clear title status (e.g., valid title in the name of the seller) and/or clear lien status (e.g., no outstanding liens) for the vehicle or other product to be purchased. In some examples, this verification may be performed by accessing vehicle title and/or lien information stored on the blockchain(s) 122 associated with the vehicle.

In some implementations, regulatory action(s) may be performed (506) on the blockchain(s) 122 associated with the vehicle. Some examples of regulatory action(s) may be banking related. Regulatory action(s) may regulate one or more of the following: the funds used for the transaction; the terms of sale; the notarization that may be legally required; the regulatory requirements of e-signing where the blockchain captures the agreements that the buyer and seller make as part of the transaction; and so forth. Regulations involved in auto sales or other asset sales may be enforced by blockchain sidechains. Such regulations may result from laws, rules, or other acts of any level of government.

The sales transaction module(s) 118 may establish (508) communications with the sales exchange module(s) 116, and instruct the sales exchange module(s) 116 to update (510) the blockchain(s) 122 associated with one or more of the vehicle, the buyer, or the seller, to indicate that the transaction is completed. This may include updating blockchain data to indicate a transfer of title from the seller to the buyer, updating the buyer's blockchain data to indicate that the funding source has been used to purchase the vehicle, or other updates. The buyer's funds may be released (512) to the seller. In some implementations, the private key for the vehicle may be delivered to the buyer application 106, to enable the buyer to activate the ignition system through the buyer application 106 and operate the vehicle.

Figure 6:
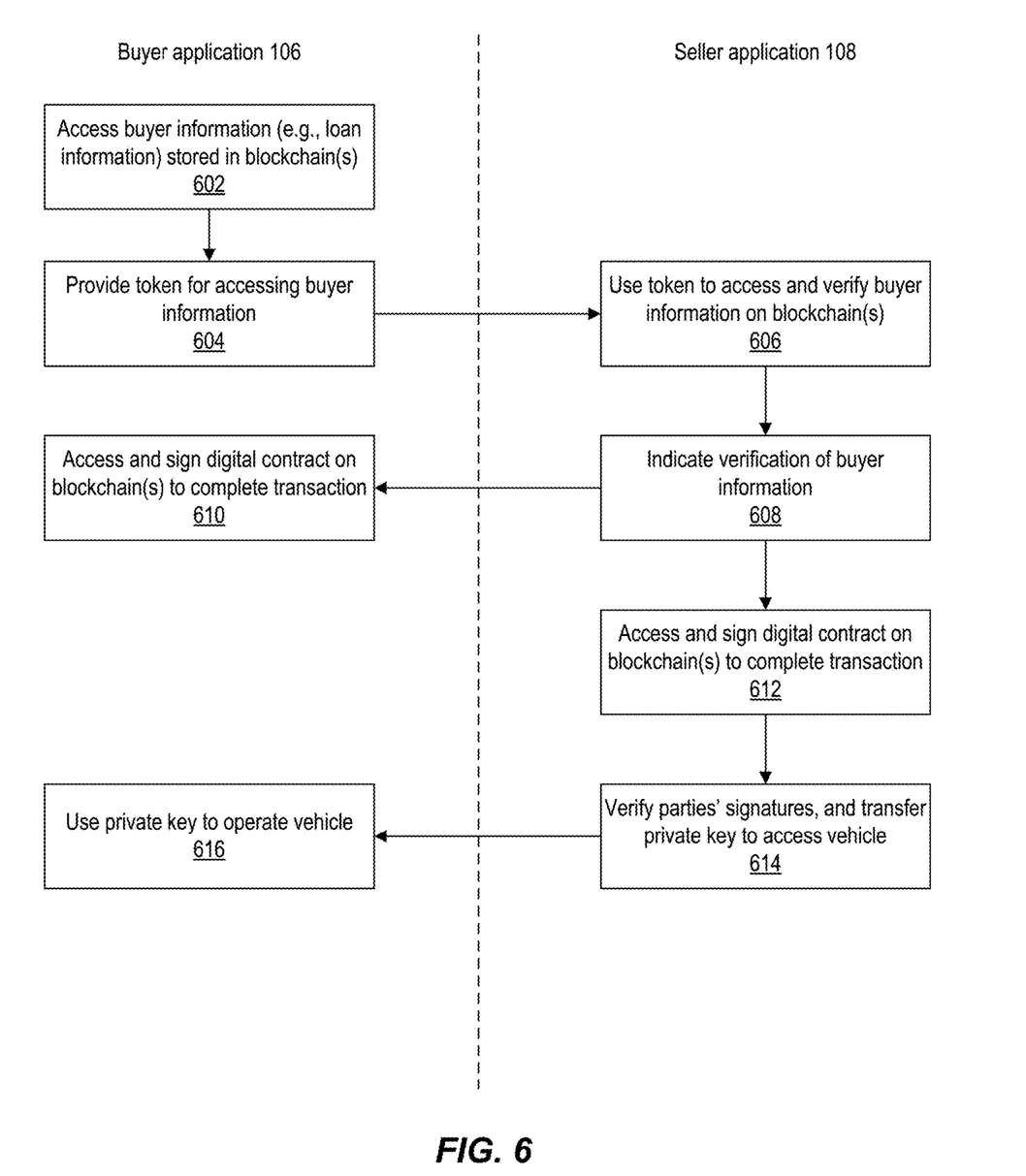
FIG. 6 depicts a flow diagram of an example process for managing a vehicle purchase transaction between a buyer and a seller using data stored on blockchain(s), according to implementations of the present disclosure.

FIG. 6 depicts a flow diagram of an example process for managing a vehicle purchase transaction between a buyer and a seller using data stored on blockchain(s), according to implementations of the present disclosure. Operations of the process may be performed by one or more of the buyer application 106, the seller application 108, the sales exchange module(s) 116, the sales transaction module(s) 118, the blockchain(s) 122, or other software module(s) executing on one or more of the buyer computing device(s) 102, the seller computing device(s) 104, the sales exchange device(s) 112, the sales transaction device(s) 114, or other device(s).

FIG. 6 depicts a process in which communications are being performed between the buyer application 106 and the seller application 108. In some implementations, such communications may be performed (e.g., directly) between the buyer application 106 and the seller application 108 via the network(s) 110. In some implementations, at least some of the communications between the buyer application 106 and the seller application 108 may be via one or more of the sales exchange module(s) 116 or the sales transaction module(s) 118, with such module(s) acting as intermediary.

The buyer application 106 may access (602) buyer information, such as loan information or other funding source information, stored on the blockchain(s) 122. Based on the accessed buyer information, the buyer application 106 may generate and provide (604) a token to enable access to the buyer information on the blockchain(s) 122. The token may be communicated to the seller application 108. In some examples, the token may be encoded in a scannable barcode such as a one-dimensional UPC or multi-dimensional QR code. The barcode may be presented in a UI of the buyer application 106, and the seller may use a camera or other optical data input device on the seller computing device(s) 104 to scan (e.g., capture an image of) the barcode. The seller application 108 may decode the scanned image of the barcode to extract the encoded token. In some examples, the token may be a cryptographic key (e.g., private key) that is communicated to the seller application 108.

The seller application 108 may use (606) the token to access the blockchain(s) 122 and verify the buyer information on the blockchain(s) 122. Such verification may include verifying that sufficient funds are available for the purchase, that the buyer carries auto insurance, that the buyer has a valid driver's license, or other criteria for the purchase. If the buyer information is determined to satisfy the criteria for the purchase, an indication may be sent (608) to the buyer application 106. In response to the indication, the buyer may employ the buyer application 106 to access and sign (610) a digital contract (e.g., a smart contract) to complete the transaction. The digital contract may be stored on one of the blockchain(s) 122. The seller may employ the seller application 108 to access and sign (612) the digital contract to complete the transaction.

Based on verifying that both parties have agreed to the transaction, and signed the digital contract, the seller application 108 may transfer (614) the private key to the buyer application 106. As described above, the private key may be a cryptographic key that is paired with a public key associated with the vehicle. The buyer application 106 may employ (616) the private key to activate the ignition system of the vehicle and enable the buyer to operate the vehicle.

In some instances, different users of the vehicle may have different keys that are associated with different permissions for using the vehicle. For example, one user of the vehicle, such as a parent, may be able to access and start the vehicle using their private key, and may then use the vehicle without restrictions. Another user (e.g., a driving-age child) may be able to access, start, and use the vehicle using their private key, under certain restrictions. Such restrictions can include geographic restrictions on where and/or how far the user can drive, time restrictions on when the user can drive the vehicle (e.g., only during the day, only on weekends), and/or other types of restrictions. In such instances, the access controls, rules, and/or restrictions governing use of the vehicle may be stored on the blockchain(s).

Figure 7:
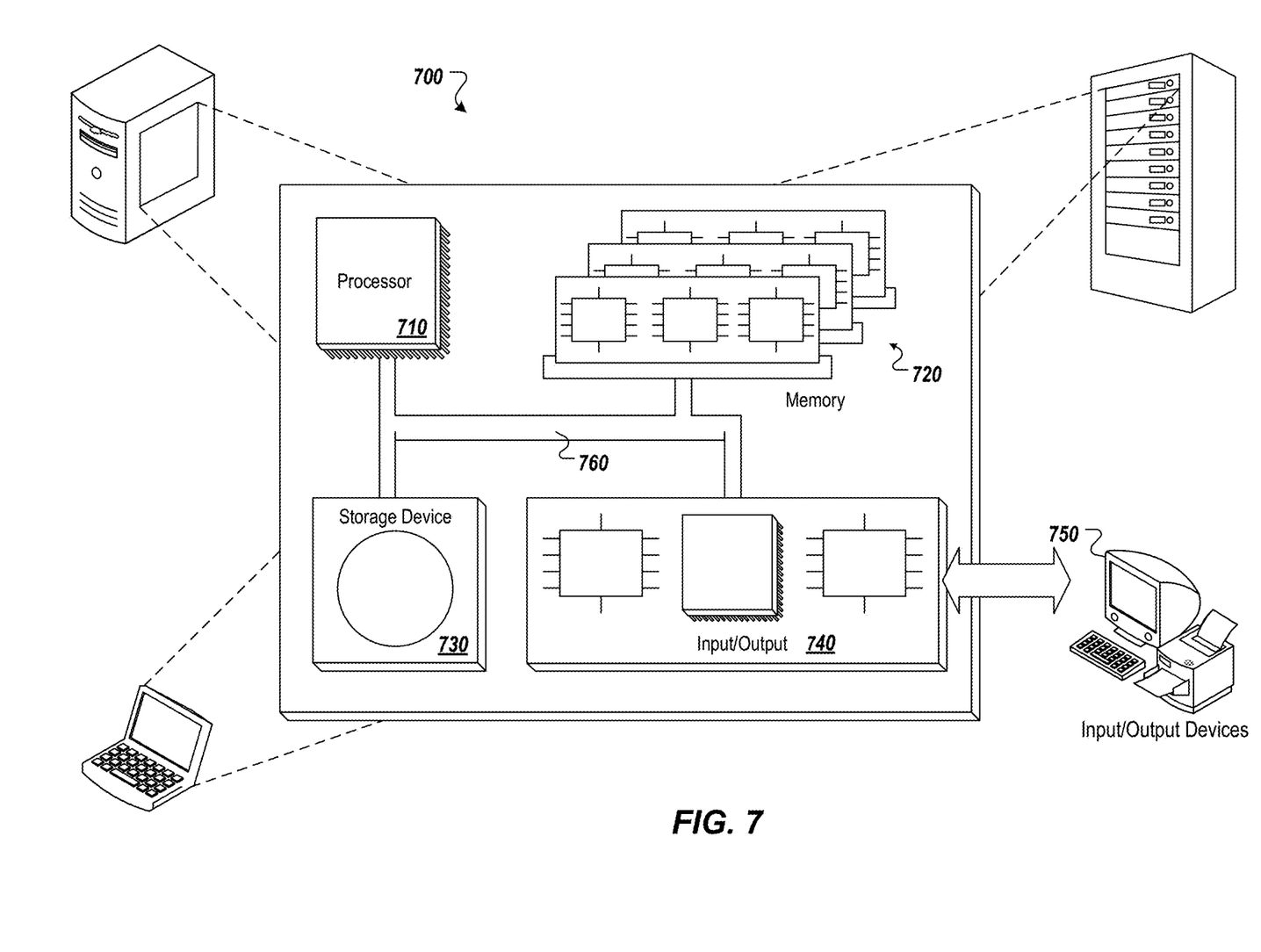
FIG. 7 depicts an example computing system, according to implementations of the present disclosure.

FIG. 7 depicts an example computing system, according to implementations of the present disclosure. The system 700 may be used for any of the operations described with respect to the various implementations discussed herein. For example, the system 700 may be included, at least in part, in one or more of the buyer computing device(s) 102, the seller computing device(s) 104, the sales exchange device(s) 112, the sales transaction device(s) 114, or the data storage 120 described herein. The system 700 may include one or more processors 710, a memory 720, one or more storage devices 730, and one or more input/output (I/O) devices 750 controllable via one or more I/O interfaces 740. The various components 710, 720, 730, 740, or 750 may be interconnected via at least one system bus 760, which may enable the transfer of data between the various modules and components of the system 700.

The processor(s) 710 may be configured to process instructions for execution within the system 700. The processor(s) 710 may include single-threaded processor(s), multi-threaded processor(s), or both. The processor(s) 710 may be configured to process instructions stored in the memory 720 or on the storage device(s) 730. The processor(s) 710 may include hardware-based processor(s) each including one or more cores. The processor(s) 710 may include general purpose processor(s), special purpose processor(s), or both.

The memory 720 may store information within the system 700. In some implementations, the memory 720 includes one or more computer-readable media. The memory 720 may include any number of volatile memory units, any number of non-volatile memory units, or both volatile and non-volatile memory units. The memory 720 may include read-only memory, random access memory, or both. In some examples, the memory 720 may be employed as active or physical memory by one or more executing software modules.

The storage device(s) 730 may be configured to provide (e.g., persistent) mass storage for the system 700. In some implementations, the storage device(s) 730 may include one or more computer-readable media. For example, the storage device(s) 730 may include a floppy disk device, a hard disk device, an optical disk device, or a tape device. The storage device(s) 730 may include read-only memory, random access memory, or both. The storage device(s) 730 may include one or more of an internal hard drive, an external hard drive, or a removable drive.

One or both of the memory 720 or the storage device(s) 730 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 700. In some implementations, the CRSM may include a data store that provides storage of computer-readable instructions or other information in a non-transitory format. The CRSM may be incorporated into the system 700 or may be external with respect to the system 700. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 710 and the memory 720 may be supplemented by, or incorporated into, one or more application-specific integrated circuits (ASICs).

The system 700 may include one or more I/O devices 750. The I/O device(s) 750 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 750 may also include one or more output devices such as a display, LED(s), an audio output device (e.g., a speaker), a printer, a haptic output device, and so forth. The I/O device(s) 750 may be physically incorporated in one or more computing devices of the system 700, or may be external with respect to one or more computing devices of the system 700.

The system 700 may include one or more I/O interfaces 740 to enable components or modules of the system 700 to control, interface with, or otherwise communicate with the I/O device(s) 750. The I/O interface(s) 740 may enable information to be transferred in or out of the system 700, or between components of the system 700, through serial communication, parallel communication, or other types of communication. For example, the I/O interface(s) 740 may comply with a version of the RS-232 standard for serial ports, or with a version of the IEEE 1284 standard for parallel ports. As another example, the I/O interface(s) 740 may be configured to provide a connection over Universal Serial Bus (USB) or Ethernet. In some examples, the I/O interface(s) 740 may be configured to provide a serial connection that is compliant with a version of the IEEE 1394 standard.

The I/O interface(s) 740 may also include one or more network interfaces that enable communications between computing devices in the system 700, or between the system 700 and other network-connected computing systems. The network interface(s) may include one or more network interface controllers (NICs) or other types of transceiver devices configured to send and receive communications over one or more networks, such as the network(s) 110, using any network protocol.

Computing devices of the system 700 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 700 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for purchasing a vehicle comprising:
   accessing, by a first application executing on a first computing device, buyer information from at least one blockchain, wherein the buyer information comprises loan and/or insurance information;
   responsive to accessing the buyer information from the at least one blockchain, generating, by the first application, a token from the buyer information and encoding, by the first application, the token in a scannable code;

displaying, by the first application, the scannable code to a second application executing on a second computing device via a user interface of the first application receiving, by the first application, an indication that the buyer information satisfies a criteria for purchase of a vehicle;

accessing, by the first application, a digital contract for the vehicle from the at least one blockchain and signing, by the first application, the digital contract;

receiving, by the first application, a private key of the vehicle from the second application; and communicating, by the first application, with an ignition system of the vehicle over a communication network and starting, by the first application, the ignition system using the private key.

2. The method of claim 1, wherein:

the buyer information indicates a source of funds to be transferred; and the source of funds includes one or more of a financial account identifier or an approved loan identifier.

3. The method of claim 1, wherein the scannable code comprises a cryptographic key for accessing the buyer information from the at least one blockchain.

4. A system, comprising:

at least one processor; and a memory communicatively coupled to the at least one processor, the memory storing instructions which, when executed by the at least one processor, cause the at least one processor to perform operations comprising:

accessing, by a first application executing on a first computing device, buyer information from at least one blockchain, wherein the buyer information comprises loan and/or insurance information;

responsive to accessing the buyer information from the at least one blockchain, generating, by the first application, a token from the buyer information and encoding, by the first application, the token in a scannable code;

displaying, by the first application, the scannable code to a second application executing on a second computing device via a user interface of the first application; and receiving, by the first application, an indication that the buyer information satisfies a criteria for purchase of a vehicle;

accessing, by the first application, a digital contract for the vehicle from the at least one blockchain and signing, by the first application, the digital contract;

receiving, by the first application, a private key of the vehicle from the second application; and communicating, by the first application, with an ignition system of the vehicle over a communication network and starting, by the first application, the ignition system using the private key.

5. The system of claim 4, wherein:

the buyer information indicates a source of funds to be transferred; and the source of funds includes one or more of a financial account identifier or an approved loan identifier.

6. The system of claim 4, wherein the scannable code comprises a cryptographic key for accessing the buyer information from the at least one blockchain.

7. One or more non-transitory computer-readable media storing instructions which, when executed by at least one processor, cause the at least one processor to perform operations comprising:

accessing, by a first application executing on a first computing device, buyer information from at least one blockchain, wherein the buyer information comprises loan and/or insurance information;

responsive to accessing the buyer information from the at least one blockchain, generating, by the first application, a token from the buyer information and encoding, by the first application, the token in a scannable code;

displaying, by the first application, the scannable code to a second application executing on a second computing device via a user interface of the first application; and receiving, by the first application, an indication that the buyer information satisfies a criteria for purchase of a vehicle;

accessing, by the first application, a digital contract for the vehicle from the at least one blockchain and signing, by the first application, the digital contract;

receiving, by the first application, a private key of the vehicle from the second application; and communicating, by the first application, with an ignition system of the vehicle over a communication network and starting, by the first application, the ignition system using the private key.

8. The one or more non-transitory computer-readable media of claim 7, wherein:

the buyer information indicates a source of funds to be transferred; and the source of funds includes one or more of a financial account identifier or an approved loan identifier.

9. The one or more non-transitory computer-readable media of claim 7, wherein the scannable code comprises a cryptographic key for accessing the buyer information from the at least one blockchain.

10. The method of claim 1, wherein the communication network comprises a near field communication (NFC) network.

11. The system of claim 4, wherein the communication network comprises a near field communication (NFC) network.

12. The one or more non-transitory computer-readable media of claim 7, wherein the communication network comprises a near field communication (NFC) network.

* * * * *